United States Patent [19]
Judd

[11] Patent Number: 4,902,078
[45] Date of Patent: Feb. 20, 1990

[54] DOCUMENT HOLDER CLIP

[75] Inventor: Thomas W. Judd, Peterborough, N.H.

[73] Assignee: Curtis Manufacturing Company, Inc., Jaffrey, N.H.

[21] Appl. No.: 378,635

[22] Filed: Jul. 12, 1989

[51] Int. Cl.⁴ .............................................. A47B 81/06
[52] U.S. Cl. ................................... 312/7.2; 248/442.2; 248/918; 24/545; 24/67.5
[58] Field of Search ............... 248/442.2, 447.1, 447.2, 248/918; 24/545, 557, 449, 67.5, 67.9; 312/7.2, 233

[56] References Cited

U.S. PATENT DOCUMENTS

| | | |
|---|---|---|
| D. 301,044 | 5/1989 | Judd . |
| 2,931,086 | 5/1960 | Rose ........................................ 24/545 |
| 4,197,026 | 5/1980 | Vorbach et al. ................... 248/442.2 |
| 4,277,863 | 7/1981 | Faneuf . |
| 4,632,471 | 12/1986 | Visnapuu ............................. 312/7.2 |
| 4,693,443 | 9/1987 | Drain .................................... 248/918 |
| 4,767,093 | 8/1988 | Jowes .............................. 248/447.1 |

FOREIGN PATENT DOCUMENTS 77208415  9/1988  Taiwan .

Primary Examiner—Kenneth J. Dorner
Assistant Examiner—Gerald A. Anderson
Attorney, Agent, or Firm—Richard P. Crowley

[57] ABSTRACT

A document holder clip which comprises a right angle support bracket to be secured to the side of a monitor screen, an extending arm pivotably engaged with the support bracket and a document holder clip adaptable for slidable movement on the upper edge of the extending arm, which clip has two generally parallel clip arms and opposing jaw edges and includes a resilient spring finger at one end of one arm and a retainer at the one end of the other arm, the spring finger resiliently holding the jaw elements at the other end in a biased, closed position and on the application of finger pressure, the end of the spring finger moves slidably inward to open the jaws to an open position to permit the insertion of a document.

9 Claims, 1 Drawing Sheet

DOCUMENT HOLDER CLIP

BACKGROUND OF THE INVENTION

Document holder clips are known which permit the retention of a document adjacent to a monitor screen so as to improve data entry and to reduce eye fatigue of a user. Typically, such document holder clip (see for instance U.S. Pat. Des. No. 301,044, issued May 9, 1989) positions a document or copy adjacent to a computer screen monitor so that the eyes of the user will no longer have to refocus from the desktop to the screen monitor. Generally, the document holder clip is secured to one side of the screen monitor generally by the employment of a removable, fabric hook-type fastener, such as a Velcro ®-type fastener, both on the inside of the right angles of the support bracket of the clip holder and Velcro ® placed onto the side and top of the screen monitor case.

The clip holder has generally an extending arm which is pivotably swivelable at the one end so that the document clip holder may be swung generally out of the way, such as parallel, to the side of the screen monitor when not in use, and yet may be easily be positioned, for example at a 90° position to the screen, when in use to hold the document. The document holder clip contains a clip subject to finger pressure so that sheets, such as standard paper, may be inserted under the clip and between the jaw end of the clip and against a solid portion of the extending arm on one side to retain the document in position, and therefore, also conserve desktop space.

A clip holder is also disclosed in Taiwan patent application no. 77208415, published Mar. 21, 1989 (publication No. 110,251) in which a metal spring clip is slidably mounted for adjustment along the extending arm.

The document holder clip as illustrated in U.S. Pat. Des. 301,044 is so constructed as to show a plastic-type hinge secured to the extending arm with a retaining element so positioned as to be resiliently biased against the viewing side of the extending arm so that any document to be viewed may be retained between the end of the jaws and the extending arm by the application of pressure to the fixed, slidable clip element.

There are a wide variety of clip holders for holding of documents and other items, such as for example identification cards having an aperture therein. One identification card holder of the clip type is illustrated in U.S. Pat. No. 4,277,863, issued July 14, 1981. The clip illustrated is designed for engaging into an aperture on a identification card and employs two stiff, parallel members joined in the middle by a flexible hinge. One of the parallel members has at the other end a spring finger biased toward the other parallel member to bias the jaws at the end of each parallel member into a closed position. The spring finger forms an open loop for engaging into an aperture in an identification card so that the card is offset and permits the card to hang parallel along side the hinged members.

It is desirable to provide for a new and improved document clip holder which includes a slidably mounted clip on the extending arm and wherein the clip may be used so that document sheets can be inserted on either side of the extending arm and used by right or left handed users.

SUMMARY OF THE INVENTION

The invention relates to a document holder clip. In particular, the invention concerns a document holder clip which provides for a slidable, improved clip on the upper edge of the extending arm of the document holder clip and which clip with double jaws permits easy positioning of documents on either side of the extending arm and which clip holds the document in an effective and secure manner.

The document holder clip as hereinafter described and illustrated is an improvement of the holder clip as illustrated in U.S. Pat. Des. No. 301,044 in that the present invention is directed to a document holder wherein the entire holder is formed of only three separate components all easily assembled and all of a plastic material. Further, the clip holder has a clip designed to slide along the upper edge of the extending arm of the document holder clip and be securely held by side flanges. The clip is designed and constructed so as to have the jaws easily moved from an open, non-retaining position to a closed, secure retaining position of the documents and wherein the documents may be retained on both or either sides of the extending arm so that use of the holder clip by a left or right handed person is facilitated.

The improved document holder clip is adapted to hold a document, preferably on both or one side, adjacent to a monitor screen and which holder clip comprises in combination: a support bracket means to be secured to the side of a monitor screen case or other support surface; an extending, board-like arm, and which arm has a slidable clip mounted thereon; and the clip slidably moves along substantially the length of the extending arm. The clip is designed to have a "C" shaped jaw element at one end to retain the document between the edge of the jaw element and the surface of the extending arm and which clip element is designed to have the jaw element biased in a tension, closed position, and yet which clip may be easily moved to an open position by the application of finger pressure to push together the upper ends of the parallel members which make up the clip. The holder clip also contains a means to provide for the pivotable movement of the extending arm about the support bracket and generally on an axis substantially parallel to the one side of the screen monitor case.

The holder clip has an extending arm which includes two separate, slightly extended flanges slightly below the upper edge of the extending arm and extending substantially the length of the extending arm, and which includes a clip which is slidably mounted on the upper edge and secured beneath the flanges so that the clip may be securely and slidably moved along the top edge of the extending arm. The clip includes a pair of parallel members secured together by a hinge intermediate of the members, and one end of the members comprising jaw elements which are tensionally biasedly closed in a normal position and wherein the other end of the parallel members are disposed to be moved between an outward position wherein the jaws of the one end are tension-biased by the hinge element against the surface of the extending arm, that is, in a closed, document retaining position, and through the application of inward finger pressure by the user at the other end of the parallel elements to move to an open position and to permit the removal of one document and/or the insertion of another document and the return of the clip to the biased, closed position. The clip includes a spring finger which is secured to one parallel member on the other side biased against a stop on the other member to hold the jaw end in a closed, document retaining position. By the application of user pressure on the other ends of the two parallel members, the spring finger slides along a ridge on the inside of the other parallel member and forces the jaws into a non-document retaining, open position.

The clip also contains a pair of "C" type retaining arms extending downwardly from beneath the central hinge so as to grasp the lower side of the flanges on the extending arm so that the clip may be slid below the hinge along the flanges and so positioned by the user to the desired clip position.

The document holder clip will be described for the purposes of illustration only in connection with certain embodiments; however, it is recognized that various changes, corrections, additions, modifications and improvements may be made by those persons skilled in the art, all falling within the spirit and scope of the invention as illustrated.

DESCRIPTION OF THE EMBODIMENTS

Figure 1:
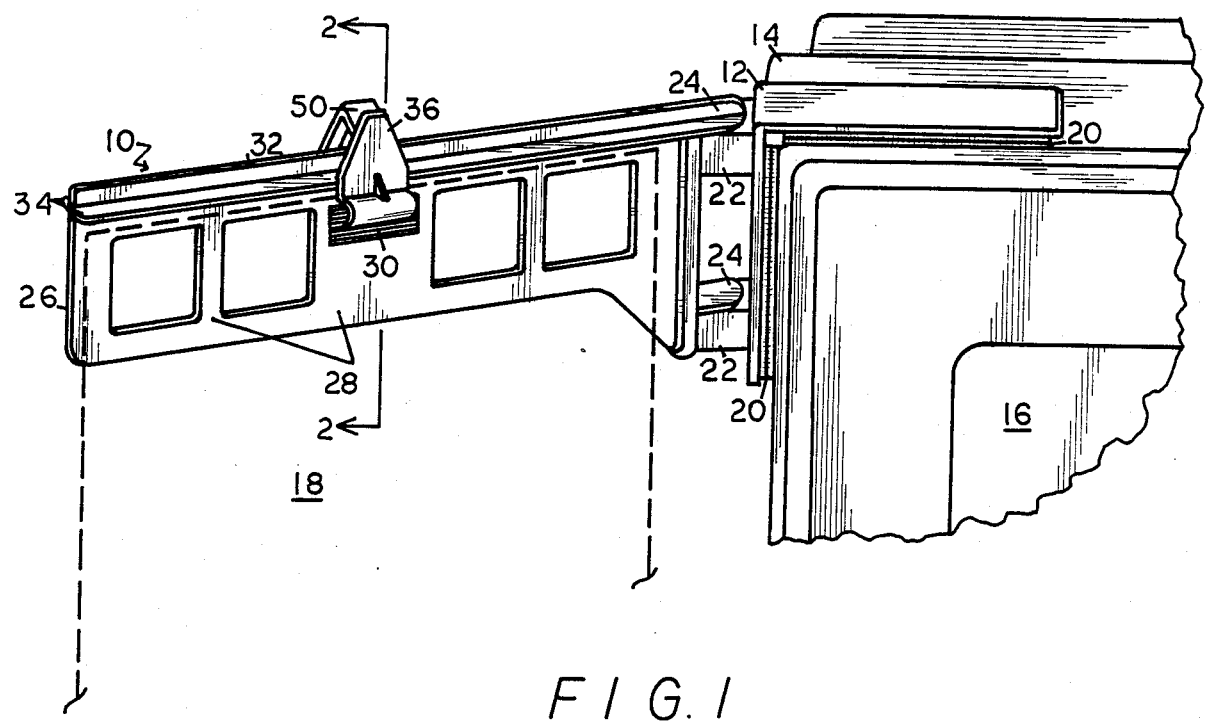
FIG. 1 is an illustrated, perspective view from above of the document holder clip of the invention secured to the side of a monitor screen with a document held in position.

With reference to the drawings, there is shown and illustrated a document holder clip 10 of the invention which includes a right angle bracket support 12 secured through a strip of Velcro ® fastener 20 secured to other side of the bracket support on one layer, and the Velcro ® glued or secured to the left-hand side of a monitor screen case 14 wherein there is a computer monitor screen 16 for the displaying of information. This arrangement provides for the easy removal of the document support holder and the copy holder clip from the side of the monitor screen case 14 and for installation on the opposite side of the monitor screen case 14 with the use of another layer of the Velcro ® fastener 20 on the opposite side of the monitor screen case 14.

As illustrated more particularly in FIG. 1, the document holder clip includes a document 18 shown in dotted lines secured by a clip 36 to a flat, extending arm 26, the extending arm 26 having a generally central, solid section 28 with striations 30 on this section and frictionally retaining the document 18 between the jaws of the clip 36 and the surface of the solid section 28. Of course, if required, the flat extending arm 26 may be solid, that is, the central solid section 28 may extend all or substantially the length of the arm 26 with or without the striations 30 thereon so as to provide a solid surface against which the clip 36 may secure a document 18 against the arm.

The flat, extending arm 26 is adapted for pivotable movement about an axis generally parallel to the side of the monitor screen case 14 through the employment of two pivot holders 22 in the side of the bracket 12 and two pivot inserts 24 extending from the one end downwardly of the arm 26 to permit the pivot holders 22 to be inserted in the pivot brackets 24 so that the extending arm 26 may pivot between a use position as illustrated, and for example, a non-use position as illustrated by dotted lines of the clip and wherein the arm 26 extends only adjacent and toward the side of the monitor screen case 14.

The extending arm 26 includes an upper edge 32 with separate short ribs or flanges 34 extending generally outward at right angles from the surface of the extending arm 26 and only slightly below the upper edge, which flanges 34 are used to retain the clip 36 so that the clip may be slidably moved as illustrated by the arrows along the upper edge 32 of the extending arm 26 so that the document 18 may be positioned as desired.

The plastic molded, slidable clip 36 comprises a pair of generally parallel clip arms 38 and 40 connected together by a resilient central hinge 42 and which clip arms 38 and 40 have respectively at one end C-shaped jaw edged 44 and 46 adapted to grasp and hold a document 18 against the surface of the extending arm 26, either on the front or back or both by jaw edges 44 and 46. The clip 36 also includes integrally molded two retaining arms 48 extending beneath the central hinge 42 and adapted to partially encircle the extending lower flanges 34 beneath the top upper edge 32 of the extending arm 26 so as to permit the clip to ride on the upper edge substantially from one to other end of the arm 26. The retaining arms 48 are designed to permit the clip to be retained on the arm 26 by flanges 24 while permitting the clip to slide along the top edge 32 of the arm 26 and may be removed from the one free end of the arm 26 as desired. The clip 36 also includes a bent spring finger element 50 extending from one arm, the end of the element extending downwardly toward the central hinge 42 with one end 56 of the spring finger slightly raised. The other parallel arm 38 includes at the other end a raised retainer stop 52 and a sliding, inner flange surface 54.

Figure 2:
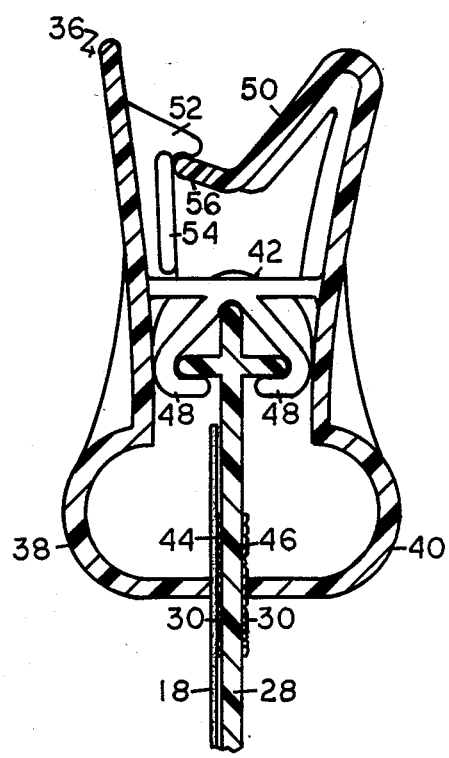
FIG. 2 is an enlarged view of the clip of the document holder clip of FIG. 1 along line 2—2 showing the clip in a closed, document-retaining position.
Figure 3:
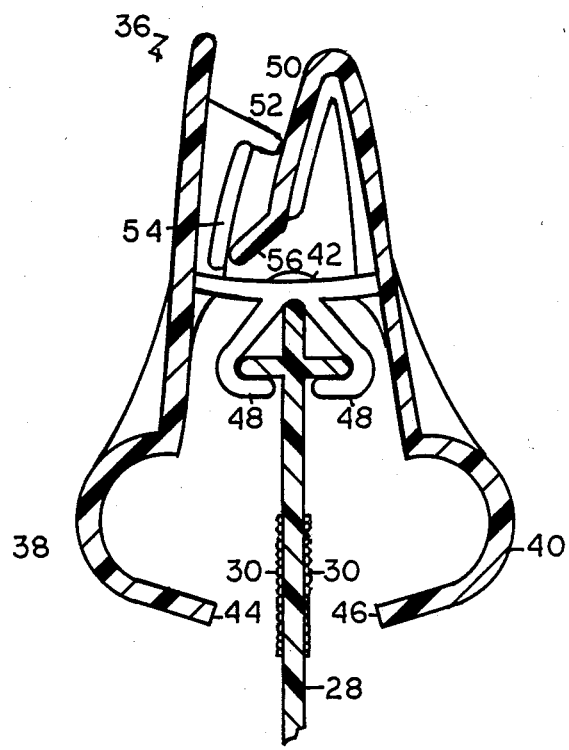
FIG. 3 is an enlarged view of the clip as illustrated in FIG. 2 in an open position.

As illustrated more particularly in FIG. 2 wherein the clip 36 is shown in its closed, document retaining position, the raised end 56 of the spring finger 50 is secured against the retainer stop 52 so that the jaw edges 44 and 46 are placed in a closed, document retaining position against the document 18 or where there is no document, against the front and back surfaces of the extending arm 26, and as illustrated, against the surface of the solid section 28. In use, when a new document is being inserted and the old document removed, the user presses together the other ends of the parallel arms 38 and 40, as illustrated more particularly in FIG. 3, so as to cause the one end of the spring finger 50 and the raised end 56 to slide downwardly along the surface of the inner flange 54 to the end which forces the jaw edges 44 and 46 into an outwardly disposed, non-document retaining position.

As described and illustrated, the document holder clip, except for the Velcro ® fasteners, is composed entirely of three separate components of a molded, high impact type plastic, which document holder clip permits the pivoting of the extending arm 26 between a document holding, user position, and a non-document holding, non-user position, generally adjacent or toward the side of the monitor screen device 14, and also permits the positioning of the document to be retained 18 against either surface of the extending arm through the use of the double jaw slidable clip 36 which slides along the upper edge 32 of the extending arm 26 so that the holder clip may be used on either side of a monitor screen.

What is claimed is:

1. A document holder clip adapted to hold a document adjacent a monitor screen, which comprises in combination:
  (a) a support bracket means to be secured adjacently to a monitor screen or other fixed support;
  (b) an extending arm having a one and other end and an upper edge with a front and back surface and having slightly raised flange elements extending outwardly from the front and rear surfaces and substantially the length of the extending arm and slightly below the upper edge of either side of the arm;
  (c) means to provide for the pivotable movement of the extending arm at the one end thereof so as to permit the extending arm to be pivotably moved between a use and a non-use position; and
  (d) a slidably mounted document clip means to retain a document, which holder means comprises:
    (i) a pair of generally parallel clip arm elements having a one and an other end, that the one end forming opposing jaws on either side of the extending arm;
    (ii) a resilient hinge means generally intermediate the generally parallel clip arm elements;
    (iii) a clip retaining means between the clip arm elements and below the hinge means which extend and fit over flanges of the arm to retain the clip means on the arm and to permit the slidable movement along the upper edge of the arm of the document clip in use;
    (iv) a resilient, bent spring finger at the other end of one of the clip arm elements, the spring finger inclined inwardly toward the hinge means; and
    (v) a spring finger retainer at the other end of the other arm clip element whereby the one end of the resilient spring finger is engaged in the spring finger retainer so that the opposing jaw elements are biased in closed, inward, document retaining position adjacent to the surface of the extending arm so as to retain a document between at least one jaw end and the surface of the extending arm and whereby upon the application of finger pressure on the ends of the clip arm element, one end of the spring finger moves downwardly toward the hinge means and away from the retaining stop to place the opposing jaws in an open position for the removal of the document.

2. The clip of claim 1 wherein the support bracket means comprises a right angle support bracket adapted to be secured to one side of a monitor screen case and which includes a means on the support bracket to secure the support to the monitor screen case.

3. The clip of claim 3 wherein the extending arm includes a solid section and is characterized by a surface on the solid portion to aid frictionally in the retention of a document thereon.

4. The clip of claim 1 wherein the pair of clip arm elements have at the one end generally "C" shaped opposing jaws on either side of the extending arm.

5. The clip of claim 1 wherein the clip holder retaining means comprises a pair of partially curved, shaped arms to extend over and beneath each of the flanges on the extending arm.

6. The clip of claim 1 wherein the spring finger retainer at the other end of the other clip arm element also includes an inner flange extending to the spring finger retainer whereby on the occasion of finger pressure by the user to the other end of the clip arm elements, one end of the spring finger element moves from a retaining position slidably downwardly on the inner flange to permit the opposing jaw edges to move to an open position.

7. The clip of claim 1 wherein the spring finger element includes at the one end thereof a slightly raised, short arm, which short arm is placed against the spring finger retainer to place the opposing jaw edges in a resiliently biased, closed position.

8. The clip of claim 1 which includes a document retained against the surface of the extending arm by the document holder clip means.

9. The document viewing system, which viewing system comprises in combination:
  (a) a case for a monitor screen;
  (b) a monitor screen within the case; and
  (c) the spring clip of claim 1 secured to the one side of the monitor screen case and a document retained by the document holder clip means against the surface of the extending arm to be used by a viewer.

* * * * *